US009383969B2

(12) United States Patent
Van Der Sluis et al.

(10) Patent No.: US 9,383,969 B2
(45) Date of Patent: Jul. 5, 2016

(54) RANDOM NUMBER GENERATING SYSTEM BASED ON MEMORY START-UP NOISE

(75) Inventors: Erik Van Der Sluis, Utrecht (NL); Geert Jan Schrijen, Venlo (NL); Helena Handschuh, Palo Alto, CA (US)

(73) Assignee: INTRINSIC ID B.V., Eindhoven (NL)

( * ) Notice: Subject to any disclaimer, the term of this patent is extended or adjusted under 35 U.S.C. 154(b) by 319 days.

(21) Appl. No.: 14/110,009

(22) PCT Filed: Apr. 5, 2012

(86) PCT No.: PCT/EP2012/056277
§ 371 (c)(1),
(2), (4) Date: Oct. 4, 2013

(87) PCT Pub. No.: WO2012/136763
PCT Pub. Date: Oct. 11, 2012

(65) Prior Publication Data
US 2014/0040338 A1 Feb. 6, 2014

Related U.S. Application Data

(60) Provisional application No. 61/471,771, filed on Apr. 5, 2011.

(51) Int. Cl.
*G06F 7/58* (2006.01)
*H04L 9/08* (2006.01)

(52) U.S. Cl.
CPC .............. *G06F 7/588* (2013.01); *H04L 9/0866* (2013.01)

(58) Field of Classification Search
CPC ................................... G06F 7/58; G06F 7/588
See application file for complete search history.

(56) References Cited

U.S. PATENT DOCUMENTS

| 7,233,965 | B2 * | 6/2007 | Rarick | G06F 7/588 708/250 |
| 2002/0126841 | A1 * | 9/2002 | Arai | G06F 7/588 380/46 |
| 2005/0129247 | A1 * | 6/2005 | Gammel | G06F 7/582 380/286 |
| 2006/0104443 | A1 | 5/2006 | Chari et al. | |

(Continued)

FOREIGN PATENT DOCUMENTS

| CN | 101957740 | 1/2011 |
| JP | 2006-24140 | 1/2006 |
| JP | 2010-266417 | 11/2010 |

OTHER PUBLICATIONS

International Search Report for PCT/EP2012/056277, mailed Nov. 7, 2012.

(Continued)

*Primary Examiner* — Chuong D Ngo
(74) *Attorney, Agent, or Firm* — Nixon & Vanderhye P.C.

(57) ABSTRACT

A random number generating system for generating a sequence of random numbers comprising a memory, the memory being writable, volatile and configured such that the memory contains an at least partially random memory content upon each powering-up of the memory, an instantiating unit configured for seeding the random number generating system with a seed dependent upon the at least partially random memory content, the sequence of random numbers being generated in dependence upon the seed, and an over-writing unit configured for over-writing at least part of the memory with random numbers generated by the random number generating system in dependence upon the seed.

16 Claims, 8 Drawing Sheets

(56) References Cited

U.S. PATENT DOCUMENTS

| | | | |
|---|---|---|---|
| 2007/0147156 A1* | 6/2007 | Nishino | G11C 29/52 365/226 |
| 2010/0293424 A1 | 11/2010 | Katagi et al. | |
| 2011/0022648 A1* | 1/2011 | Harris | G06F 7/588 708/254 |

OTHER PUBLICATIONS

Written Opinion of the International Searching Authority for PCT/EP2012/056277, mailed Nov. 7, 2012.

Vikram, B. S. et al., "Entropy extraction in metastability-based TRNG", Hardware-Oriented Security and Trust (HOST), (Jun. 13, 2010), pp. 135-140.

Holcomb, D.E. et al., "Power-Up SRAM State as an Identifying Fingerprint and Source of True Random Numbers", IEEE Transactions on Computers, vol. 58, No. 9, (Sep. 1, 2009), pp. 1198-1210.

Holcomb, D.E. et al., "Initial SRAM State as a Fingerprint and Source of True Random Numbers. For RFID Tags", Internet Citation, (Jul. 11, 2007), pp. 1-12.

* cited by examiner

100

200

RANDOM NUMBER GENERATING SYSTEM BASED ON MEMORY START-UP NOISE

This application is the U.S. national phase of International Application No. PCT/EP2012/056277, filed 5 Apr. 2012, which designated the U.S. and claims the benefit of U.S. Provisional Application No. 61/471,771, filed 5 Apr. 2011, the entire contents of each of which are hereby incorporated by reference.

FIELD OF THE INVENTION

The invention relates to a random number generating system for generating a sequence of random numbers.

BACKGROUND OF THE INVENTION

Random number generation is used in widely differing fields, ranging from simulations, e.g., Monte Carlo methods, telecommunication systems, e.g., for selecting spread spectrum frequencies to gambling, etc. Although, the quality of the random numbers used is important for all of these fields, it takes on particular importance in the field of cryptography.

In cryptography, random numbers are used for many purposes and often the security of a cryptographic system hinges on the quality of the random numbers. For example, key generation frequently employs a source of random numbers. Other applications of random numbers in cryptography include the generation of a nonce, generation of a challenge for use in a challenge-response protocol, as initialization vector, for example as the initialization vector for a block cipher running in CBC mode.

Other security applications may also employ random numbers, for example, countermeasures against side channel analysis may employ blinding of secret information with a random blinding number.

In these applications, if the random numbers are not sufficiently random, they compromise the security of the cryptographic application in which they are used.

A sequence of random number is preferably unpredictable. Thus an attacker cannot predict a sequence before it has been produced better than chance. Similarly, the sequence cannot be reliably reproduced. After a sequence has been produced it is not feasible to produce it again.

For unpredictable sequence it is infeasible given the security demands of the application to predict what the next random bit will be, even if one has complete knowledge of the algorithm, of the hardware generating the sequence, and all of the previously generated bits.

A true random number sequence has all of these properties, but they may also be obtained from a deterministic random number sequence if it has a suitably random seed.

The objects that a random number generator produces may be interpreted in various ways, as numbers, typically from some pre-determined range, as characters, or as bits, etc. A sequence of bits may be mapped to a sequence of numbers and vice versa. The term random bit generator is also used, and may be regarded as a random number generator which generates random integral numbers between 0 and 1. What applies to a random bit generator applies also mutatis mutandis to a random number generator and vice versa.

Random bit generators (RBGs) may be divided into two classes. The random number generators in one class produce bits non-deterministically, where every bit of output is based on a physical process that is unpredictable; these random bit generators are commonly known as non-deterministic random bit generators (NRBGs). The random number generators in the other class compute bits deterministically using an algorithm; this class of RBGs is known as Deterministic Random Bit Generators (DRBGs). An NRBGs is also referred to as a true random number generator. A DRBG is also referred to as a pseudo random number generator.

A Deterministic Random Bit Generator is typically initiated with a seed. A seed is a limited sequence of numbers, e.g. a string of bits used as input to a deterministic random number generator. The seed will determine all or a portion of an internal state of the generator. The entropy of the seed must be sufficient to support the security requirements of the DRBG. The seed may be obtained from a true random number generator.

Deterministic Random Bit Generators are further described in NIST Special Publication 800-90, *Recommendation for Random Number Generation Using Deterministic Random Bit Generators*, March 2007. We will refer to this publication as the NIST standard.

Most true random number generators use thermal noise as the random process. For example, thermal noise in integrated circuits describes small voltage fluctuations that exist on conductors in equilibrium. Other sources of randomness include decay of radioactive material, quantum mechanics processes, frequency instability of free-running oscillators, etc.

An additional source of true random numbers is described in: D. Holcomb, W. Burleson, K. Fu, *Power-up SRAM State as an Identifying Fingerprint and Source of True Random Numbers*, IEEE Transactions on Computers, 2009. In the paper it is described that an SRAM may be used as a true random number generator, since the memory content of an SRAM is partially random after the SRAM has been powered-up.

SUMMARY OF THE INVENTION

There are several disadvantages with the true random number generator of Holcomb et al. Since a memory has a fixed size, the amount of randomness that may be produced from it is limited. In fact, since a memory will typically not be fully random, the memory contents will be conditioned, resulting in a severe reduction of the number of random bits that may be obtained from a start-up. Accordingly, the design of Holcomb et al will be unsuitable in most practical applications.

Moreover, if the memory used is integrated in a computer, there is a further disadvantage. If the computer undergoes a soft reset, the content of the memory is unchanged. An application that expects the content of the memory to be truly random would use the same random numbers a second time. For cryptographic application this may seriously undermine the security of the system. Also other applications of random numbers would be compromised since the assumption of unrepeatability is violated.

The random number generating system for generating a sequence of random numbers according to the invention avoids or mitigates the above mentioned disadvantages. The random number generating system comprises a memory. The memory is writable, volatile and configured such that the memory contains an at least partially random memory content upon each powering-up of the memory. The random number generating system also comprises an instantiating unit configured for seeding the random number generating system with a seed dependent upon the at least partially random memory content. The sequence of random numbers is generated in dependence upon the seed. The random number generating system also comprises an over-writing unit configured for over-writing at least part of the memory with random numbers generated by the random number generating system in dependence upon the seed.

The content of the memory is used to generate a seed. Since the sequence of random numbers is generated in dependency upon a seed, there is in principle no limit to the amount of random numbers that may be generated. Even if a random number generating scheme is used which incorporates a maximum number of random numbers that may safely be generated, then this number is typically far larger than the amount of randomness that may be obtained from one memory power-up.

During a soft-reset of a device containing the random number generating system power to the memory is not interrupted. Although, the memory produces a new at least partially random memory content each time it is powered-up (e.g., during a hard reset), this effect does not occur during a soft reset where the memory is not re-powered. However, since the memory in which normally a random content would appear at a hard reset is overwritten with random numbers, this problem is solved. After either a soft or a hard reset, the sequence of random numbers produced by the random number generating system is not of inferior randomness. In particular, the random numbers produced by the random number generating system after a soft reset are not the same as the random numbers produced after a previous power-up of the memory. Applications may rely on the quality of the random numbers.

To emphasize, compared with the design disclosed in Holcomb, the invention has at least two advantages. In Holcomb the number of random numbers which may be derived from the memory is small, since it is restricted to a small percentage of the size of the memory. However, in the invention the number of random numbers that may be produced is not so limited, since the random numbers are derived from the memory in an indirect way using a random number generation system, e.g., using a deterministic random number generator based on a seed. Furthermore, in the invention, the quality of the random numbers does not deteriorate after a soft reset, whereas in Holcomb, random numbers generated after a soft reset would be exactly equal to those generated after the preceding reset.

The sequence of random numbers may be a sequence of bits. The random numbers may also be bytes, e.g. in the form of numbers in the range of 0 to 255, or words or any other suitable form. The numbers may also be represented as characters or the like. The sequence of random numbers may be placed at an output comprised in the random number generating system. The random number generating system may provide an API on which a next random number of the sequence may be requested upon which the random number generating system supplies it.

The memory is writable so that it can be overwritten by random numbers. Since the memory is volatile, over-writing the memory with random numbers has no effect on the memory contents after a hard reset. After a hard reset the memory contains a new at least partially random memory content after it is powered-up. This is advantageous, since unauthorized access to a memory is much harder if the memory is to be kept powered-up, than if the memory may be powered down in between. The memory may be a stand-alone memory, but the memory may also be part of a larger memory. For example, the memory may be one or more blocks, say one 2 kb block of a larger SRAM.

Another part of the larger memory may be allocated to other purposes, e.g., as temporary storage.

It was an insight of the inventor that it is not necessary for the over-writing unit to over-write every individual location of the memory. As long as the total entropy in the overwritten memory is not lower than the security needs required by the application which uses the sequence of random numbers, overhead may be reduced by over-writing less than the full memory.

Apart from random data other non-random data could be written to the memory. For example, elements of an internal state of the random number generation system that need not necessarily be random, e.g., a reseed counter may be written to the memory. This allows those elements to be restored after a soft-reset. Reseed counters are discussed in the NIST standard.

Volatile memory, also known as volatile storage, is computer memory that requires power to maintain the stored information, unlike non-volatile memory which does not require a maintained power supply.

The instantiating unit may derive the seed from multiple sources. In an embodiment, the random number generating system comprises an entropy source. The entropy source comprises the memory. The instantiating unit derives the seed from the entropy source. In addition to the memory the entropy source may contain other sources of entropy. For example, the entropy source may contain a clock, used as entropy source. An entropy source is a source of unpredictable data. The entropy source need not necessarily have a uniform distribution. The instantiating unit may be an instantiating unit according to the NIST standard, but this is not necessary. The instantiating unit produces a seed for starting the generation of random numbers.

The content of the memory upon power-up need not be fully random, nor does its distribution need to be uniform. It is preferred that the entropy of the content of the memory upon power-up is at least as large as the seed. However, if the entropy of the content of the memory upon power-up is smaller than the seed the invention will still function and the quality of the random sequence after a soft reset is still improved. There is no need for every individual element of the content, say individual bits or bytes, to be equally random; in fact some individual elements may not be random at all.

In an embodiment the instantiating unit is configured for storing the seed in an internal entropy pool, typically part of an internal state. The entropy pool may be stored in an internal memory of the random number generating system. The sequence of random numbers is generated in dependence upon the internal entropy pool. The entropy pool may be modified as a result of generating the sequence but this is not necessary. For example, the seed may be concatenated with a counter, which is hashed using a hash, preferably a cryptographically strong hash, e.g., sha-256. All or part of the output of the hash is used as part of the sequence of random numbers.

It is not necessary that the content of the memory is fully random. The content of the memory may have smaller entropy than its theoretical Shannon maximum entropy. In an embodiment, the random number generating system comprising a conditioning unit for compressing the entropy of the memory content into a string having a bit-length shorter than a bit-length of the memory content, the instantiating unit being configured for seeding the random number generating system with a seed dependent upon the string.

The conditioning unit preferably performs a condition function. The conditioning unit may be part of the entropy source, but this is not necessary. An entropy source that either includes a conditioning function or for which conditioning is performed on the output of the entropy source is sometimes referred to as a conditioned entropy source. The conditioning function ensures that the conditioned entropy source provides full entropy bit strings.

In an embodiment, the random number generating system comprises an internal state memory for storing an internal state, and a generating unit configured for generating a random number of the sequence of random numbers from the current internal state in conjunction with deriving a new internal state from a current internal state stored in the internal state memory. For example, the generating unit may be configured to apply a generating function to the internal state so as to produce random numbers of the sequence, and an updating function to update the internal state. The generating unit may update the internal state by writing the new internal state to the internal state memory. The instantiating unit is configured for writing to the internal state memory, e.g. for writing the seed. The instantiating unit may also perform further processing upon the seed, e.g., to extent the seed's length, and write the result of the further processing to the internal state memory. An internal state, including the current and new internal state, has a bit length equal to or smaller than a predetermined internal state size.

In an embodiment, the over-writing unit is configured to over-write the part of the memory with random numbers throughout the generation of the sequence of random numbers. This has several advantages. In this embodiment, the over-writing unit does not necessarily need to receive a reset signal in case of a reset since the contents of the memory will be suitably random after a soft reset. Furthermore, even if the over-writing unit receives a reset signal in case of a soft-reset, there is no time delay caused by overwriting the memory before the soft-reset can be executed.

There is also a security advantage, if an attacker manages at some point to get write access to the memory which will be used as an entropy source after a soft-reset, he may be able to reduce the randomness of the sequence after the soft reset. However, if the memory is updated continuously this potential threat is mitigated since additional entropy unknown to the attacker would soon be written to the memory. For example, the over-writing unit may be configured to write a random number within each elapse of a series of pre-determined time intervals, or after a predetermined number of cycles have occurred, say cycles of a central processor, say clock cycles.

In an embodiment, the over-writing unit is configured to write a random number generated by the random number generating system in dependence upon the seed to the memory each time a predetermined number of random numbers of the sequence of random numbers have been generated. For example, a random number may be written to the part of the memory upon each random number generated in the sequence.

In an embodiment, the over-writing unit is configured to write a random number generated by the random number generating system in dependence upon the seed to the memory after the system receives a request for a certain amount of random bytes from an application.

In an embodiment, the over-writing unit is configured for over-writing the memory with random numbers generated by the random number generating system in dependence upon the seed, upon the random number generating system receiving a reset signal. In particular, the over-writing unit may receive the reset signal.

Overwriting the memory after a reset signal has been received has the advantage that overwriting may proceed faster compared in total time than incremental over-writing. For performance critical applications, it may be preferred to keep non-essential steps during normal operation reduced to a minimum, while at shutdown e.g. during a soft reset more time may be available. Overwriting during shutdown, during a soft reset, also has the advantage that it counters a potential attack on the memory made during normal operation. Alternatively, the part of the memory may be overwritten completely after deriving the seed, e.g., as part of the initialization.

The reset signal may first be received by the random number generation system, which in turn signals the overwriting unit to start the over-writing.

In an embodiment, a bit-size of the at least part of the memory is at least as large as a bit-size of the seed. This has the advantage that the seed that will be generated from the content of the memory after a soft-reset ideally has an entropy that is equal to that of the sequence generated before the soft reset. Even if one of the initiating function, conditioning function, generating function etc, were to function at somewhat less than theoretical optimal, i.e., perfectly entropy preserving, then the quality of the sequence after the soft reset would be almost equal to the one before.

On the other hand, to reduce overhead one may over-write less than the full memory. In an embodiment, the bit-size of the at least part of the memory is equal to the bit size of the seed. From an entropy point of view there would be little lost, since a fully over-written memory at most contains as much entropy as was present in the seed.

To compensate for possible imperfections in these functions, and guard against entropy loss one could over-write more, e.g., as many random bits as there are bits in the internal state of the random number generator. For example, in an embodiment, the random number generating system comprises an internal state memory for storing an internal state, and a generating unit configured for generating a random number of the sequence of random numbers from the current internal state in conjunction with deriving a new internal state from a current internal state stored in the internal state memory, wherein the bit-size of the at least part of the memory is at least as large as a bit-size of the internal state.

However, again to reduce overhead, one could reduce the amount of additional bits, say to less than twice the bit-size of the internal state, preferably, less than or equal to the bit-size of the internal state.

Choosing the bit-size of the at least part of the memory equal to the bit-size of the internal state, has the advantage that one can more easily argue that no entropy is lost during the over-writing of the memory, since the amount of what is written back is not less than the amount of data in the internal state. At the same time, overhead is reduced to a minimum.

The random numbers that are used to overwrite the part of the memory may be obtained from different sources. In one embodiment, the random numbers generated by the random number generating system in dependence upon the seed for over-writing the at least part of the memory are part of the sequence of random numbers generated by the random number generating system. An advantage of this approach is that the design effort to produce good random numbers need not be duplicated to produce two streams of random numbers, one for the sequence and one for overwriting.

The random numbers generated in the sequence may be re-used for overwriting the memory, that is, a random number is both outputted for use in some application and written to memory. This would not necessarily cause re-use of those values after a soft-reset since an initialization step would follow. However, in another embodiment, some numbers in the sequences are used for overwriting the memory or for output to an application, but not both.

Instead of using part of the sequence for overwriting it is also possible to generate them specifically for the purpose. This has the advantage that the random stream that can be observed in an application is uncorrelated from the random stream that could be observed by memory inspection (if that would be possible). This however, requires the generation of two streams.

In an embodiment, the random numbers generated by the random number generating system in dependence upon the seed for over-writing the at least part of the memory comprises intermediate data of the random number generating system which are not part of the sequence of random numbers generated by the random number generating system. This has the advantage that the overwriting random numbers and the outputted random numbers are at least less correlated than if the numbers from the same stream were used. However, there is no additional computational overhead.

In an embodiment, the random number generating system according to the invention comprises an internal state memory for storing an internal state and a generating unit configured for generating a random number of the sequence of random numbers from the current internal state in conjunction with deriving a new internal state from a current internal state stored in the internal state memory, wherein the generating unit is configured for deriving the new internal state from the current internal state before generating a random number of the sequence of random numbers from the current internal state, and wherein the over-writing unit is configured for over-writing the at least part of the memory with random numbers derived from the new internal state before generating a random number of the sequence of random numbers from the current internal state.

By pre-computing the new internal state and using that for over-writing the memory before the current state is used to generate a next random number in the sequence, one can be sure that whenever a reset occurs, the values in the memory have never been used to generate output. Hence it is assured that state information is never re-used. Despite this fact, the solution still allows to continue with the production of random output bits after a soft-reset occurs. The instantiating algorithm may be configured for copying the internal state used for over-writing back from the memory to the internal state memory upon resumption after the reset.

In an embodiment, the sequence of random numbers is fully dependent upon the seed. That is apart from deriving the seed, the random number generator is a deterministic random number generator. A deterministic random number generator typically has a larger throughput. In case of deriving randomness from the start-up noise in a memory, the separation between true-random generation of a seed and deterministic generation of the sequence from the seed also allow to generate more random numbers. In an embodiment, the sequence of random numbers is fully dependent upon the internal state.

Any type of volatile, writable memory that may be configured such that a part of the memory contains an at least partially random memory content upon each powering-up of the memory may be used for the invention. Particularly, suitable are SRAM memory, flip-flops and latches. For example, a sequence of flip-flops may be read out after power-up. One could even use bus-keepers, or a collection of bus-keepers as the memory, combined with a circuit configured for writing values to bus-keepers.

SRAM and flip-flops are also used to produce physical unclonable functions (PUFs). In such application, a certain amount of randomness can be tolerated as long as the power-up values are sufficiently persistent across different power-ups. However, in the invention, even memory can be used which is highly random after start-up.

Another possible choice for the volatile, writable memory is DRAM.

The random number generating system may be an electric random number generating system, having an electric memory. Also the instantiation unit and the over-writing unit are preferably electric. A random number generating system according to the invention may also be comprised in an electronic device, in particular a mobile electronic device, such as mobile phone, set-top box, computer, etc. A further aspect of the invention concerns a smart card comprising a random number generating system according to the invention.

Yet a further aspect of the invention is an electronic cryptographic device comprising a random number generation system according to the invention. For example, the electronic cryptographic device may be configured for generating using the random number generation system according to the invention any one of a nonce, a challenge for use in a challenge-response protocol, an initialization vector, for example as the initialization vector for a block cipher running in CBC mode, a random blinding number, a cryptographic key, for example a symmetric key, a asymmetric key, a session key.

A further aspect of the invention concerns a method of generating a sequence of random numbers. The method comprises powering-up of a memory, the memory being writable, volatile and configured such that a part of the memory contains an at least partially random memory content upon each powering-up, seeding with a seed dependent upon the at least partially random memory content, generating the sequence of random numbers in dependence upon the seed, over-writing at least part of the memory with random numbers generated by in dependence upon the seed.

A random number generating system according to the invention may be advantageously included into mobile phones, smart card readers, smart phones, embedded devices, RFID tags, point-of-sale terminals, VoIP phones, tablets, security modules, TPM modules, MTM modules, network routers, PCs, laptops.

Incorporating the random number generating system according to the invention into an electronic device, such an electronic device mentioned above, may be implemented by incorporating an electronic memory, preferably an SRAM memory, an instantiation unit, and a device for managing the memory.

A method according to the invention may be implemented on a computer as a computer implemented method, or in dedicated hardware, or in a combination of both.

Executable code for a method according to the invention may be stored on a computer program product. Examples of computer program products include memory devices, optical storage devices, integrated circuits, servers, online software, etc.

In a preferred embodiment, the computer program comprises computer program code means adapted to perform all the steps of a method according to the invention when the computer program is run on a computer. Preferably, the computer program is embodied on a computer readable medium.

An interesting aspect of the invention is that devices which were not initially designed for security applications may be retrofitted with security functions. In particular, devices which do not have a random number device may still be configured for random number generation in a secure manner.

An aspect of the invention therefore concerns a device comprising a processor for executing computer software instructions and a memory. The memory is writable, volatile and configured such that the memory contains an at least partially random memory content upon each powering-up of the memory. The device comprises a further memory comprising computer software instructions configured for implementing an instantiating unit and an over-writing unit according to the invention. For example, the processor may be a micro controller, e.g., an 8051 processor. For example, the software may be software according to the invention.

An aspect of the invention concerns a method of retrofitting a device comprising a processor for executing computer software instructions and a memory. The memory is writable, volatile and configured such that the memory contains an at least partially random memory content upon each powering-up of the memory. The device comprises a further memory for comprising computer software instructions. The method of retrofitting comprises installing software according to the invention into the further memory.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

Figure 1:
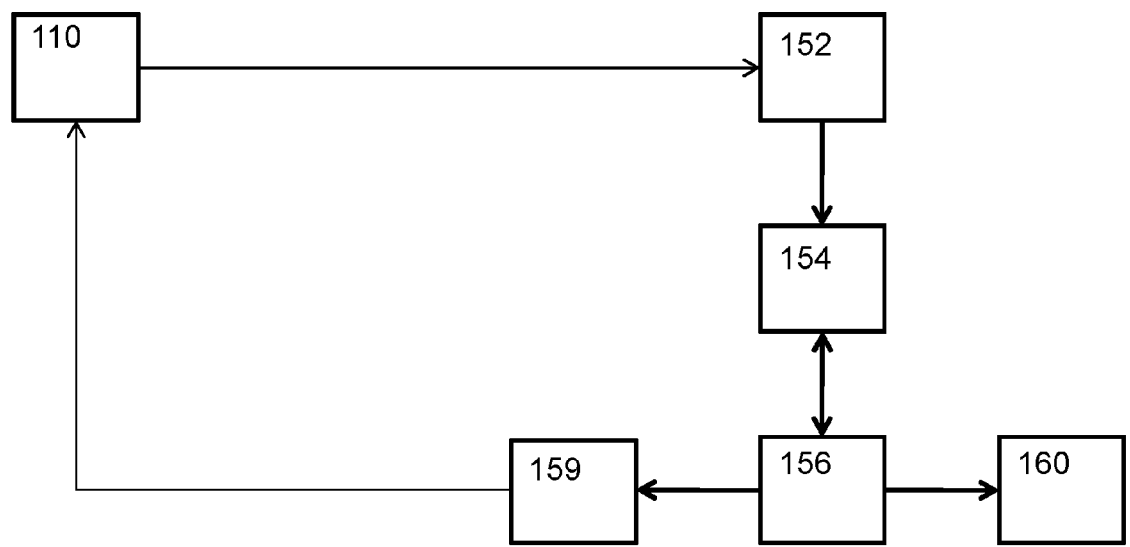
FIGS. 1, 2, 3, and 4 illustrate in schematic form various embodiments according to the invention.

LIST OF REFERENCE NUMERALS 100 a random number generating system
110 a memory
112 a further entropy source
120 a conditioning unit
130 a distinguisher
150 a deterministic random number generator
152 an instantiating unit
154 an internal state memory
156 a generating unit
158 a un-instantiating unit
159 an over-writing unit
160 an application
200, 300, 400 a random number generating system
410 a un-instantiating unit
500 a smart card
510 an integrated circuit
505 a card
520 a processing unit
522 a memory
524 a physical unclonable function
526 a communication element
530 a bus
540 a smart card
600 a flowchart
610 powering-up of a writable, volatile memory
620 seeding with a seed dependent upon an at least partially random memory content obtained form a part of the memory
630 generating the sequence of random numbers in dependence upon the seed
640 Over-writing at least part of the memory with random numbers generated in dependence upon the seed.
710 Receiving a request
720 Generating random numbers from current internal state
730 Deriving new internal state from current internal state
740 Writing new internal state to internal state memory
750 Overwriting memory using new internal state

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 shows a random number generating system 100. System 100 comprises a memory 110. Memory 110 is a writable, volatile memory and configured such that the memory contains an at least partially random memory content upon each powering-up of the memory. Memory 110 may be part of a larger memory, in which case memory 110 refers to the part of the memory that contains an at least partially random memory content upon each powering-up of the memory and which is used by instantiating unit 152.

Below we give an overview of some possible choices for memory 110. Memory 110 may be a static random access memory (SRAM). SRAMs have the property that after they are powered-up, they are filled with a random pattern of on-bits and off-bits, also referred to as one and zero valued bits. Although the pattern will repeat itself to some extent if the SRAM if powered-up a next time, there are sufficient differences between subsequent power-up for the SRAM to serve as an entropy source.

Memory 110 may be a collection of memory elements. Suitable volatile memory elements include a flip-flop and a latch. At start up, the memory element, such as may be included in an integrated circuit, will be filled with a random value. The random value depends on the precise variations in the production process while the memory element was manufactured. A slight alteration in the configuration of the various components that construct the memory element may alter the random value.

Again, it is unpredictable with what content a particular memory element will power-up. Some of these memory elements may repeat itself more or less reliably, whereas other memory element will show a high degree of randomness. A collection of memory elements may be used as memory 110.

Due to unavoidable variations during production, e.g. deep submicron process variations, the behavior of the components of an SRAM relative to each other is at least slightly random. These variations are reflected, e.g., in a slightly different threshold voltage of the transistors in the memory cells of the SRAM. When the SRAM is read out in an undefined state, e.g., before a write action, its output of the SRAM depends on the random configuration.

SRAM cells whose transistor threshold voltages are well balanced are more likely to have a random startup behavior than cells whose threshold voltages are slightly unbalanced due to process variations.

The memory 110 may be a so-called physical unclonable function (PUF). In that case the content of the memory 110 after power-up could also be used to derive a unique string, e.g., through the application of helper data. Note that helper data removes the presence of noise from the content of the memory contains an at least partially random memory content upon each powering-up of the memory. The unique string may be used as a cryptographic key. After, before, or during the derivation of the key, the original memory content, i.e., without having noise removed from it, may be used to derive a seed according to the invention.

In other words, memory 110 could be used as a PUF and as an entropy source. The requirements of a PUF and of an entropy source are different though and to a certain extent contradictory. A PUF requires a certain degree of overlap between subsequent power-ups, whereas an entropy source requires a certain degree of difference.

A Physical Unclonable Function is a function which is embodied as a physical system, in such a way that an output of the function for an input is obtained by offering the input to the physical system in the form of a stimulus, and mapping the behavior that occurs as a result of an interaction between the stimulus and the physical system to an output, wherein the interaction is unpredictable and depends on essentially random elements in the physical system, to such an extent, that it is unfeasible to obtain the output, without having had physical access to the physical system, and that it is unfeasible to reproduce the physical system. Some types of PUFs allow a wide range of different inputs, some types allow a more limited range of inputs, or may even allow only a single input. Challenging a PUF with some single challenge may also be called an 'activation' of the PUF.

For a PUF it would be desirable that when it is evaluated multiple times for the same challenge the PUF would produce multiple responses which are all equal. This property is not necessary though, and, in practice, most PUFs do not posses it. As long as the multiple responses lie sufficiently close to each other, the PUF can be usefully applied for deriving a unique string. Given the fact that PUF outputs are in practice noisy, a memory based PUF can also be used to derive a random seed.

Deriving a unique string from memory 110 is entirely optional. In fact, the invention allows the use of a memory having such a high degree of randomness in its start-up content that it would not be practical or even possible to use that memory as a PUF for deriving a unique string.

An additional advantage of the invention is the following. Memory of the type used for PUFs, e.g., SRAMs, are subject to so called ageing. For example, if the same data pattern is stored in SRAM memory for a long time, transistor threshold voltages change due to Negative Bias Temperature Instability (NBTI) effects, which may have negative influence on the noise (i.e. reducing it). However, writing back random data into memory 110 prevents the memory cells from ageing into a certain direction. This effect is improved if the overwriting extents to the entire memory 110. This effect is also and/or further improved if the overwriting continues throughout the time memory 110 is powered-on.

System 100 comprises an internal state memory 154 for storing an internal state of the system 100.

System 100 further comprises an instantiating unit 152. Instantiating unit 152 is configured for seeding the random number generating system with a seed dependent upon the at least partially random memory content. In system 100, instantiating unit 152 is connected to memory 110 to obtain the at least partially random memory content. From the at least partially random memory content, and optionally other sources, instantiating unit 152 creates a seed. Instantiating unit 152 stores the seed in internal state memory 154.

Instantiating unit 152 may be as described in the NIST standard, i.e. a function having one or more inputs for receiving random data and producing a seed, i.e., a random starting value for use as internal state.

System 100 further comprises generating unit 156. Generating unit 156 is connected to internal state memory 154 for reading and writing access. Generating unit 156 is configured for generating a sequence of random numbers in dependence upon the internal state, e.g., as stored in internal state memory 154. Generating unit 156 may use an output generating algorithm to produce a new random number which is part of the sequence of random numbers from the internal state, generating unit 156 may use an internal state updating algorithm to update the internal state to a new internal state and write the new internal state to internal state memory 154.

Generating unit 156 initially takes as input the initial state from the instantiate function. Generating unit 156 is preferably configured to generate pseudorandom bits on request. Upon receiving the request, e.g., from application 160, generating unit 156 generates the random numbers and produces a new internal state for the next request. The random numbers may alternatively be pushed, without receiving a request first. The request maybe received by other parts of the random number generation system first.

The instantiate function used by instantiating unit 152 and generate function used by generating unit 156 may be implemented by using a hash function. An example is specified in section 10.1.1 of the NIST standard. In particular, FIG. 8 of this specification (pp. 45) shows a graphical presentation of a possible embodiment of instantiating unit 152 and generating unit 156. The values "V", "reseed counter" and "C" can be regarded as the internal state of the algorithm. The pseudorandom bits are the output bits of the system.

Note, that the sequence of random numbers is generated in dependence upon the seed and upon the internal state.

System 100 is connected to an application 160 via generating unit 156. For example application 160 is a key exchange protocol, say, a Diffie-Hellman protocol. During the course of a Diffie-Hellman protocol one or more random numbers are needed to execute the protocol steps. Application 160 receives the random numbers from generating unit 156. Application 160 may be any other application that requires random numbers, e.g., cryptographic applications, or other, say, a Monte Carlo simulation application.

System 100 further comprises an over-writing unit 159. Overwriting unit 159 obtains random numbers depending on the seed as well. As we will show there are various options on how overwriting unit 159 exactly obtains these random numbers. FIG. 1 shows overwriting unit 159 connected to generating unit 156 for obtaining random numbers generated by the random number generating system in dependence upon the seed.

Overwriting unit 159 is configured to overwrite memory 110. Note that in case memory 110 is part of a larger memory, overwriting unit 159 need only overwrite that part of the larger memory from which instantiating unit 152 obtains random memory content. Overwriting unit 159 may also overwrite the entire larger memory.

Overwriting unit 159 may overwrite memory 110 in one operation. For example, overwriting unit 159 may overwrite the memory upon receiving a reset signal. The reset signal indicates that a soft reset in is progress. Overwriting unit 159 may receive the signal from an operating system. Overwriting unit 159 may give a further signal, e.g., to the operating system upon completion of the overwriting, thus signaling that the soft reset may proceed. The use of a further signal is optional. Instead overwriting unit 159 may also take a predetermined amount of time which fits in the soft reset cycle.

Overwriting unit 159 may also overwrite the memory upon instantiating unit 152 having derived the seed. For example, instantiating unit 152 may send a seed complete signal to overwriting unit 159 and overwriting unit 159 may be configured to overwrite the part of memory 110 upon receiving the seed complete signal.

Overwriting unit 159 may also spread the over-writing of memory 110 over a longer period. For example, the overwriting unit may be configured to over-write the part of the memory with random numbers throughout the generation of the sequence of random numbers.

Overwriting unit 159 may comprise an over-write complete flag, the flag is set if memory 110 has been entirely overwritten by overwriting unit 159 once. Overwriting unit 159 does not over-write further if the flag is set. The flag is reset upon a soft or hard reset. The over-write complete flag may be set after a predetermined number of memory locations of memory 110 have been overwritten. The predetermined number may correspond to the size of memory 110, to the size of the seed, to the size of the internal state, etc.

One way to implement spreading of the over-writing is to write at least one random number generated by the random number generating system in dependence upon the seed each time a predetermined number of random numbers of the sequence of random numbers have been generated. For example, if the predetermined number is one, overwriting unit 159 will write a random number to memory 110 each time an user of system 100, e.g., application 160, asks or receives a random number of the sequence.

For example, overwriting unit 159 could keep a pointer, pointing into memory 110. Upon a reset, soft or hard, overwriting unit 159 sets the pointer to the start of memory 110. When overwriting unit 159 writes a random number to memory 110, he writes it to the location in memory 110 indicated by the pointer, and advances the pointer. When the pointer reaches the end of memory 110, overwriting unit 159 may set the over-write complete flag for indicating a full overwrite, overwriting unit 159 may also set the pointer back to the start of memory 110. Continuing the overwriting even though a full overwrite has taken place, decreases somewhat the correlation of the content of memory 110 after the over-writing and the seed since the content at the time of a soft reset depends on the number of requests from applications, or from how long overwriting unit 159 has been overwriting the memory. Alternatively, the over-write complete flag may be set if the difference between the pointer and the start of memory 110 equal the predetermined number.

During operation memory 110 is powered-up. As a result memory 110 contains a pattern of values that is random, or at least partially so. Preferably, the entropy measured in bits contained in memory 110 is at least as large as the bit-size of the seed produced by instantiating unit 152. Entropy may be estimated with various methods, for example using min-entropy.

Instantiating unit 152 obtains the content and derives a seed. Instantiating unit 152 then stores the seed in internal state memory 154. When application 160 needs a random number it requests a number to generating unit 156. Application 160 may use an API. Generating unit 156 may also push the random numbers. Generating unit 156 derives a new random numbers of the sequence from the internal state stored in internal state memory 154. Generating unit 156 also updates the internal state. Overwriting unit 159 uses random numbers that are derived from the seed and overwrites memory 110. At some point a soft reset occurs. Internal state 154 may be deleted, e.g. zeroized. Memory 110 is not powered-down and up and will not contain a new random state based on physical properties of memory 110. However, when instantiating unit 152 starts to derive new a seed he will find a different content in memory 110 compared to the previous power-up. Internal state memory 154 will contain a different value. Even though no power-cycling occurred, and even though internal state memory 154 may have been zeroized, it behaves as if it was reseeded in case of a hard reset. If at some point system 100 has a hard reset, then memory 110 will contain a new random state based on physical properties. So any information an attacker learns from memory 110 while system 100 was powered down has no bearing on the content of memory 110 after the subsequent powering up.

Internal state memory 154 and generating unit 156 together may produce a sequence of random numbers which is fully dependent upon the seed. Instantiating unit 152, internal state memory 154 and generating unit 156 may be the deterministic random bit generator (DRBG) specified in sections 8, 9 and 10 of the NIST standard. Alternatively, additional entropy may be added to the internal state, during operation, for example, the precise time an application makes a request for a random number may be added.

Overwriting unit 159 may use part of the sequence produced by generating unit 156 for overwriting. For example, every other random number produced by generating unit 156 is used by overwriting unit 159 for over-writing and the rest of the sequence for output, e.g., to application 160. Overwriting unit 159 may also use other random numbers than those of the sequence for overwriting.

For example, the random numbers generated by the random number generating system in dependence upon the seed for over-writing the at least part of the memory may comprise intermediate data of the random number generating system which are not part of the sequence of random numbers generated by the random number generating system. For example, part of the internal state of internal state memory 154 may be used by overwriting unit 159, say the first byte. For example, random numbers may be derived from internal state memory 154. For example, whenever overwriting unit 159 needs a random number he may hash the content of internal state memory 154. Preferably, overwriting unit 159 concatenates a fixed string to the content of internal state memory 154 before the hashing, say the fixed byte 0x04, this ensures that the random numbers used by overwriting unit 159 for overwriting are uncorrelated from those outputted by the system. Or the overwriting unit 159 may use RandomValues=h(internal state||0xA0A0A0A . . . ), wherein h is the hash function Overwriting unit 159 may also use a pre-computation of the next internal state or information derived thereof.

Especially the latter option has some interesting advantages. After a reset signal is given, the random number generator should reset and start outputting data that is independent of any data that has been output before. By pre-computing the next internal state value and storing that into memory 110 before generating the pseudorandom output bits, one can be sure that whenever a reset occurs, the values in the PUF memory have never been used to generate output (since the state information stored would only be used at the next request of random bits). Hence it is assured that state information is never re-used. Despite this fact, the solution still allows to continue with the production of random output bits after a soft-reset occurs. After a soft reset, the algorithm can continue by reading the stored state in the PUF memory and perform a new instantiate step.

System 100 may be implemented as an electronic circuit, for example as an integrated Circuit (IC) and/or as programmable logic. The programmable logic comprises, e.g., a field-programmable gate array (FPGA), a programmable logic device (PLD), or a digital signal processor (DSP), a microprocessor, etc.

Figure 2:
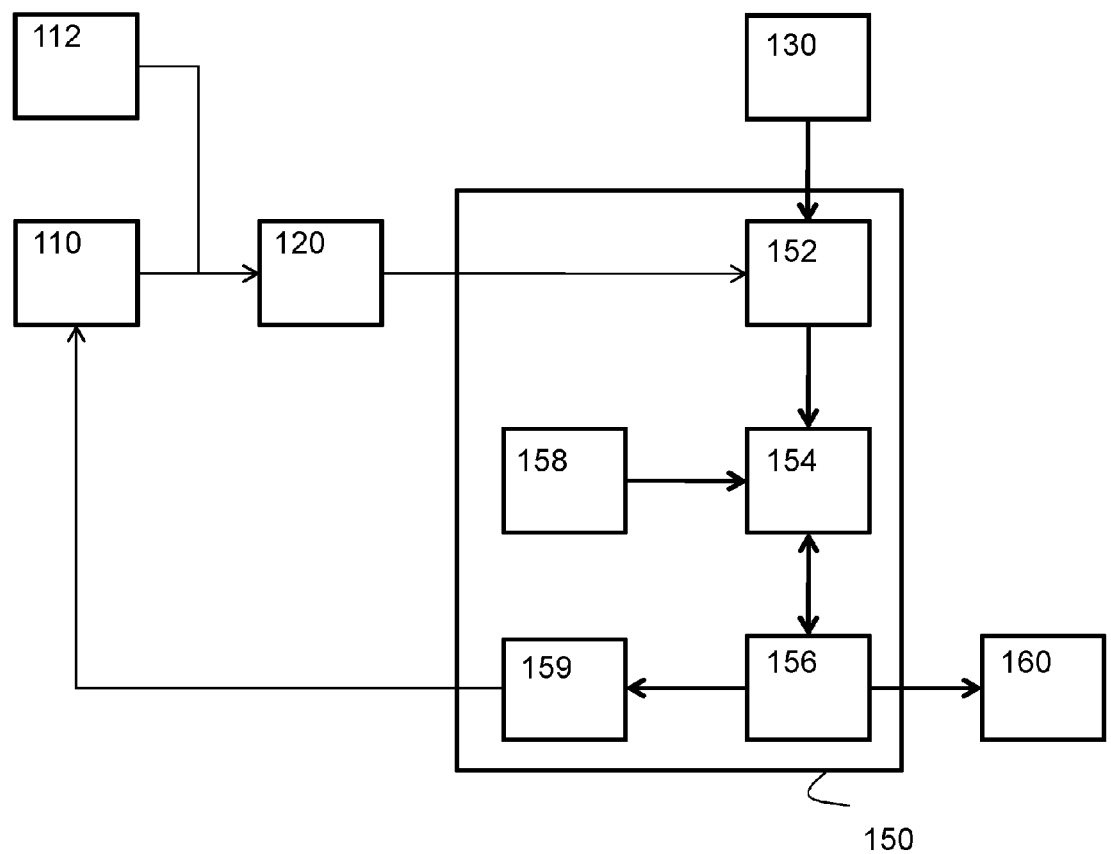

FIG. 2 shows random number generating system 200. System 200 is a variant of system 100. System 200 has all the elements of system 100 and a few more.

System 200 comprises a conditioning unit 120. Conditioning unit 120 is configured with a conditioning algorithm. A conditioning algorithm is a compression function that has good diffusion properties. For example it can be implemented as a cryptographic hash function, as a block cipher in CBC mode or for example as the derivation functions specified in section 10.4 of the NIST standard. The purpose of conditioning unit 120 is to concentrate the entropy found in memory 110 into a smaller string. If the entropy in the content of memory 110 is larger than the output size of conditioning unit 120 than the output of conditioning unit 120 has maximum entropy.

System 200 also shows a further entropy source 112. Further entropy source 112 is optional. Further entropy source 112 may use the conditioning unit 120, but may also have its own conditioning unit, or none. Further entropy source 112 could for example be a clock, or a measurement unit, e.g., attached to a hard drive to measure seek times.

System 200 further comprises a distinguisher 130. Instantiating unit 152 is configured with an additional input to receive a string from distinguisher 130. Distinguisher 130 produces a string to make sure that the output of system 200, if not random is at least different from other devices. This can be accomplished with a counter in distinguisher 130 which counts power-ups, or resets including soft and hard, or a serial number of the device etc. Distinguisher 130 is optional.

The instantiate function thus acquires entropy input and may combine it with a nonce and/or a personalization string to create a seed from which the initial internal state is created. Instantiating unit 152 may write the seed directly to the internal state memory 154, or may derive the internal state from the seed, see the NIST standard.

System 200 may comprise an un-instantiating unit 158. Upon receiving a signal that the device will shut down or will go into reset, un-instantiating unit 158 deletes the internal state. For example, un-instantiating unit 158 overwrites internal state memory 154 with zeros upon receiving a reset signal.

Preferably, instantiating unit 152, internal state memory 154, generating unit 156 together form a deterministic random number generator. Preferably, instantiating unit 152, internal state memory 154, generating unit 156 and un-instantiating unit 158 are NIST standard compliant.

An example implementation one could choose memory 110 as 2 KB of SRAM memory, or 2 KB of a larger memory. The seed derived from that memory's content after power-up could be chosen to be 256 bits. However, these numbers are exemplifying and depend on the embodiment and purpose of the application. Other useful values among many other possible choices for the size of memory 110, is 512 byte, 1 Kb, 4 Kb etc. Other useful values among many other possible choices for the size of the seed include 80 bit, 128 bit, 512 bit, 1024 bit, etc.

By analyzing the so-called min-entropy of the startup values of an SRAM using the method described in appendix C of the NIST standard, it is computed that a true random seed of at least 256 bits can be derived from SRAM startup measurements of 2 KB in size. This true random seed may be stored in internal state memory 154, and serve as input for generating unit 156. Instantiating unit 152, internal state memory 154 and generating unit 156 may be a DRBG which produces a random bit stream. After repowering of the SRAM, the conditioning algorithm makes sure that a completely new true random seed is generated from the SRAM startup data.

Only part of the bits in a PUF measurement, such as the power-up content of memory 110, is noisy and hence contains entropy for generating random numbers. The conditioning algorithm extracts all, or at least most of, the noise, i.e., entropy, from the PUF measurements and turns this into a full-entropy bit string of a certain size. An example of such a conditioning algorithm is specified in the NIST standard for use in deterministic random bit generators (DRBGs).

During operation, memory 110 and further entropy source 112 are powered up. The output of memory 110 and further entropy source 112 is processed by conditioning unit 120 to extract entropy. Instantiating unit 152 takes the extracted entropy, and optionally takes distinguishing input from distinguisher 130 to produce a seed. Conditioning unit 120 and instantiating unit 152 may be integrated into a single hash application and/or into a single unit.

If the internal state in internal state memory 154 is pre-computed and stored in memory 110, the conditioning step of conditioning unit 120 may be omitted in case of a soft reset.

Figure 3:
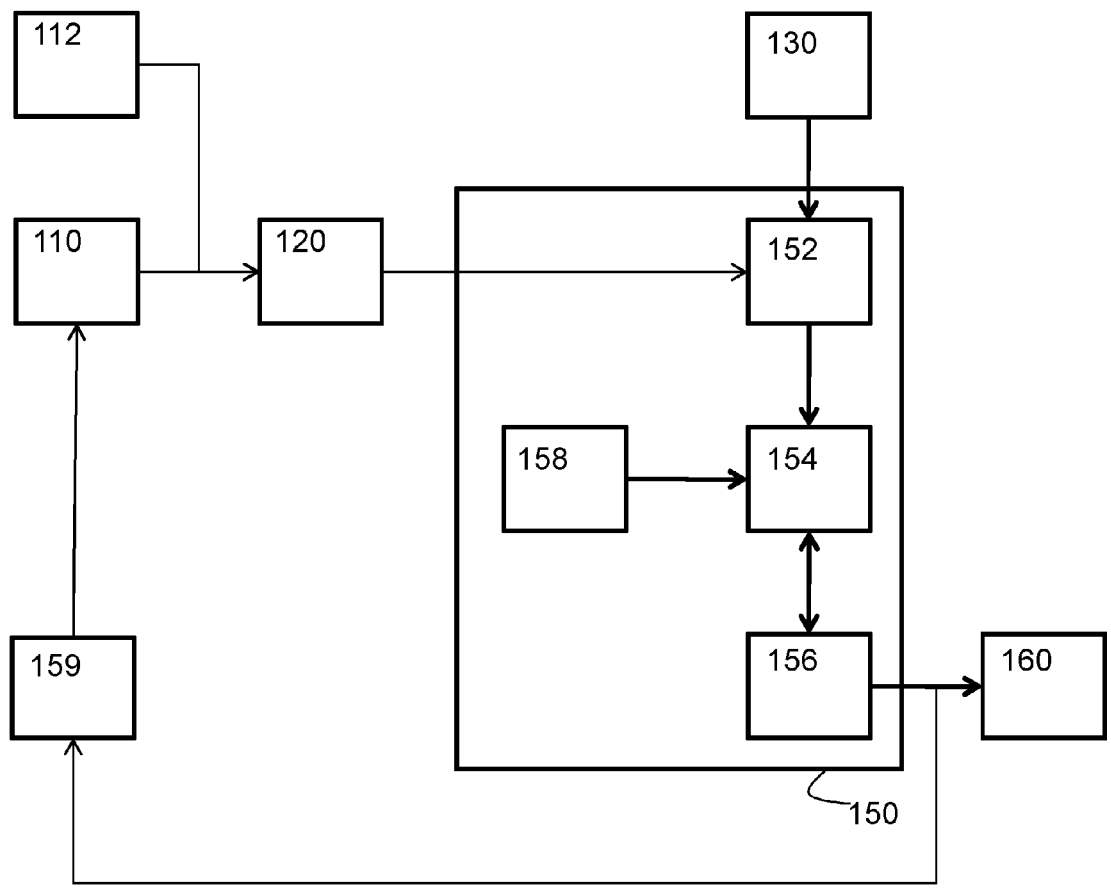

FIG. 3 shows random number generating system 300, which another possible way of arranging the units of system 200. In system 300, an already existing NIST standard compliant DRBG is retrofitted for use with the invention. Deterministic random number generator 150 comprises instantiating unit 152, un-instantiating unit 158, internal state memory 154 and generating unit 156. Deterministic random number generator 150 may be a standard compliant DRBG, e.g. a NIST standard compliant DRBG. Possibly, deterministic random number generator 150 is implemented as a black-box, say as an integrated circuit. Overwriting unit 159 is configured to receive random numbers from the same output, which also provides other applications, e.g., application 160, with random numbers. Possibly, conditioning unit 120 is part of instantiating unit 152 or deterministic random number generator 150.

In this embodiment, the random numbers generated by the random number generating system in dependence upon the seed for over-writing the at least part of the memory are part of or derived from the sequence of random numbers generated by the random number generating system.

Figure 4:
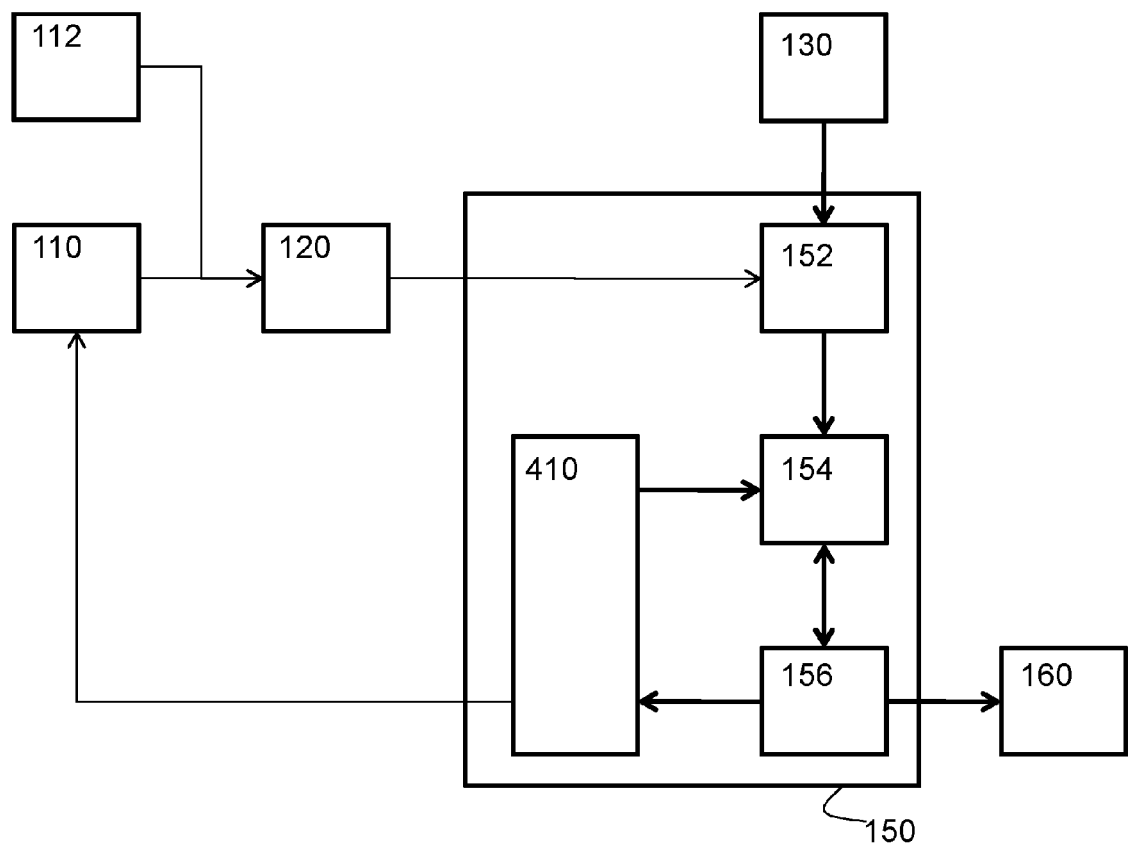

FIG. 4 shows random number generating system 400, yet another variant of system 200. System 400 comprises un-instantiating unit 410 which in turn comprises un-instantiating unit 158 and overwriting unit 159. Un-instantiating unit 410 is configured to receive a reset signal. Upon receiving the reset signal, un-instantiating unit 410 both overwrites memory 110, and internal state memory 154. For example, un-instantiating unit 410 may use generating unit 156 for updating the internal state, e.g. by having it generate a random number, and then write the contents of internal state memory 154 to memory 110, and then delete the contents of internal state memory 154, say overwrite it with zero.

Figure 7A:
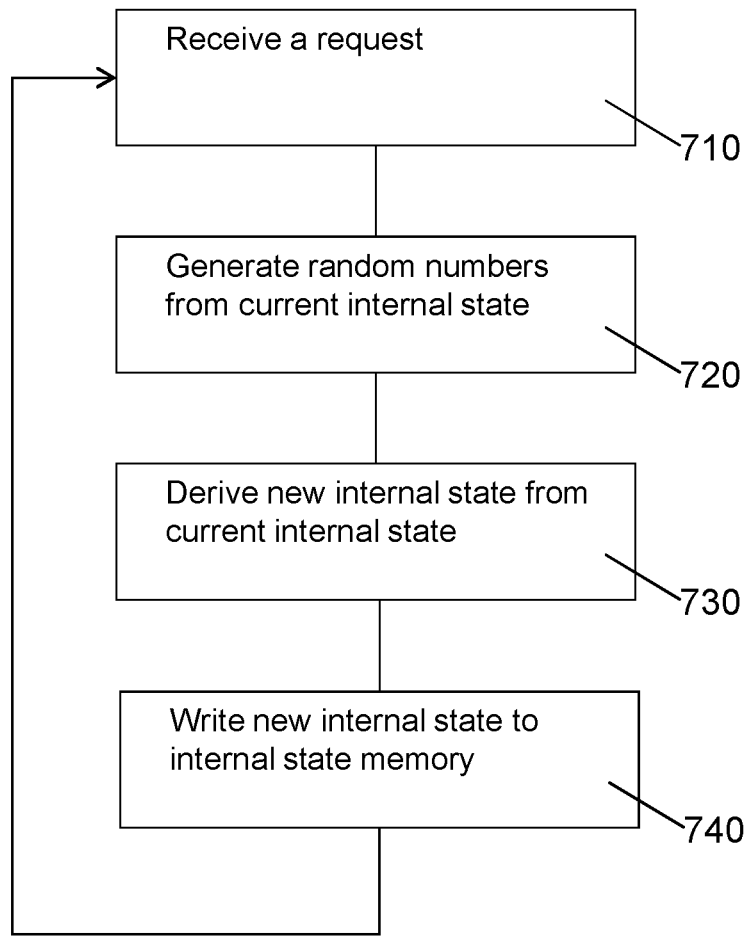
FIGS. 7a and 7b each show a flow-chart illustrating a method according to the invention.

FIG. 7a shows a method of generating random numbers for the sequence and updating the internal state memory 154.

During operational use of a random number generation system, e.g., any one of systems 100, 200, 300 or 400, a request for random numbers is received 710. The request typically indicates how many random numbers are requested. For example, a request may arrive at the random number generation system, e.g., at generation unit 156, and indicate that, say, 40 random numbers are needed. Upon receiving such a request, generation unit 156 is to generate the requested number of random numbers.

Next follows generating 720 random numbers from the current internal state. Generation unit 156 obtains the current internal state from internal state memory 154 and applies a generation function to obtain the requested number of random numbers, say 40 numbers are generated as requested. After the numbers are generated, generation function 156 updates the internal state. To do this generation unit 156 derives 730 a new internal state from the current internal state. The internal state may comprise the number of random numbers that have been generated for the sequence so far. In other words the new internal state may depend on the requested number of random numbers.

Generation unit 156 may do this by applying an updating function to the current internal state. Generation unit 156 then writes 740 the new internal state to internal state memory 154. The generated random numbers may be output after the updating of the internal state memory, e.g. by buffering them until after the updating. The generated random numbers may also be output immediately after their generation. The latter is preferred in hardware as it avoids buffering. For example, each number may be output as soon as that particular number has been generated Any mentioned way of over-writing memory 110 may be combined with this way of random number generation. For example, over-writing memory 110 may use the random numbers that are output. Over-writing memory 110 may be done once before generation is started, e.g. after the seed is derived, or once during shut-down before a soft-reset.

Figure 7B:
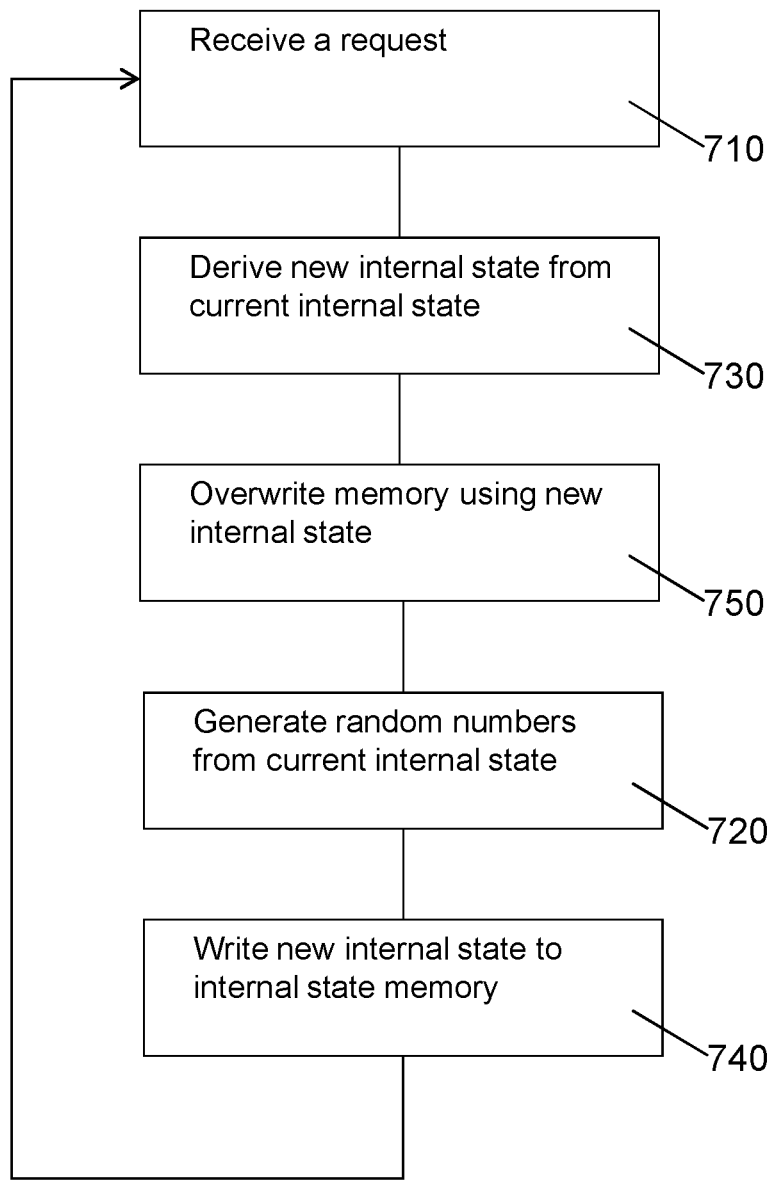

FIG. 7b shows in a flow chart an advantageous alternative to the method shown in FIG. 7a.

During operational use of a random number generation system, e.g., any one of systems 100, 200, or 400, a request for random numbers is received 710. The request typically indicates how many random numbers are requested. For example, a request may arrive at the random number generation system, e.g., at generation unit 156, and indicate that, say, 40 random numbers are needed. Upon receiving such a request, generation unit 156 is to generate the requested number of random numbers.

However, before generating the requested number of random numbers, generation unit 156 derives 730 the new internal state from the current internal state. This is the same new internal state that would have to be derived after the generation of the random numbers in FIG. 7a. In particular, if the new internal state depends on the number of random numbers that have been generated for the sequence so far, then the updating function derives the new internal state that would have to be computed after the generation of the requested number of random numbers.

The new internal state is then used for overwriting memory 110. For example, new internal state may be written to memory 110. Also data depending upon the new internal state may be written to memory 110. For example, a hash, say sha-256, may be applied to the new internal state, the result of which is written to memory 110.

Next follows, generating 720 the requested random numbers from the current internal state. Note that the random numbers are not obtained from the just computed new internal state but from the current internal state. Generation unit 156 may obtain the current internal state from internal state memory 154 and applies a generation function to obtain the requested number of random numbers, say 40 numbers are generated as requested.

After the numbers are generated, generation function 156 updates the internal state. This may be done by writing, the already computed new internal state to the internal state memory. This may also be done be deriving the new internal state again.

The method of combining updating of the internal state and generation of random numbers as shown in FIG. 7b has the advantage that assurances can be given concerning the quality of random numbers after a soft-reset, when compared to the quality of the sequence before the soft reset. This type of assurance is considered advantageous in cryptography.

In one embodiment, the sequence of random numbers that is produced by method 7b is independent from soft-resets that may occur. This may be accomplished by over writing memory 110 with data from which the new internal state can be derived. For example, by writing the new internal state itself, or by writing the internal state encrypted with an encryption key, to memory 110. After a soft reset, instantiation unit 152 is signaled that a soft reset occurred. Instantiation unit 152 will then obtain the new internal state and write it to internal state memory 154. In this way, the sequence will continue as if no soft-reset occurred. If needed instantiation unit 152 may decrypt the data in memory 110 to obtain the internal state.

The encryption key may be a fixed key stored in program memory of the device implementing the method of FIG. 7b. In one embodiment however, the encryption key is derived from the power-up contents of a volatile key memory used as PUF, say another part of a larger memory comprising memory 110. The encryption key derived from the key memory is used to encrypt the new internal state before it is written to memory 110. For example, the key memory may be used a PUF, the encryption key may be derived by applying helper data. Such key derivation methods are in itself known in the art of PUFs.

Instantiation unit 152 may be signaled about a previous soft reset by an operating system. Alternatively, generation unit 156 may write a pre-determined string to memory 110, instantiation unit 152 may conclude that a soft reset occurred by detecting the presence of the pre-determined string.

Figure 5A:
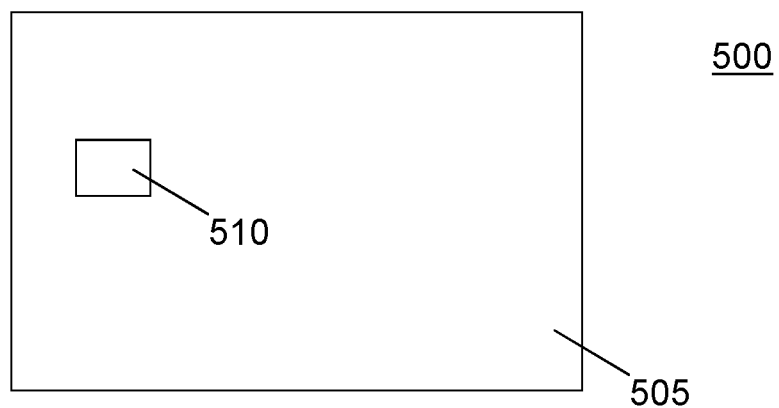
FIG. 5a shows a graphic representation of a smart card.
Figure 5B:
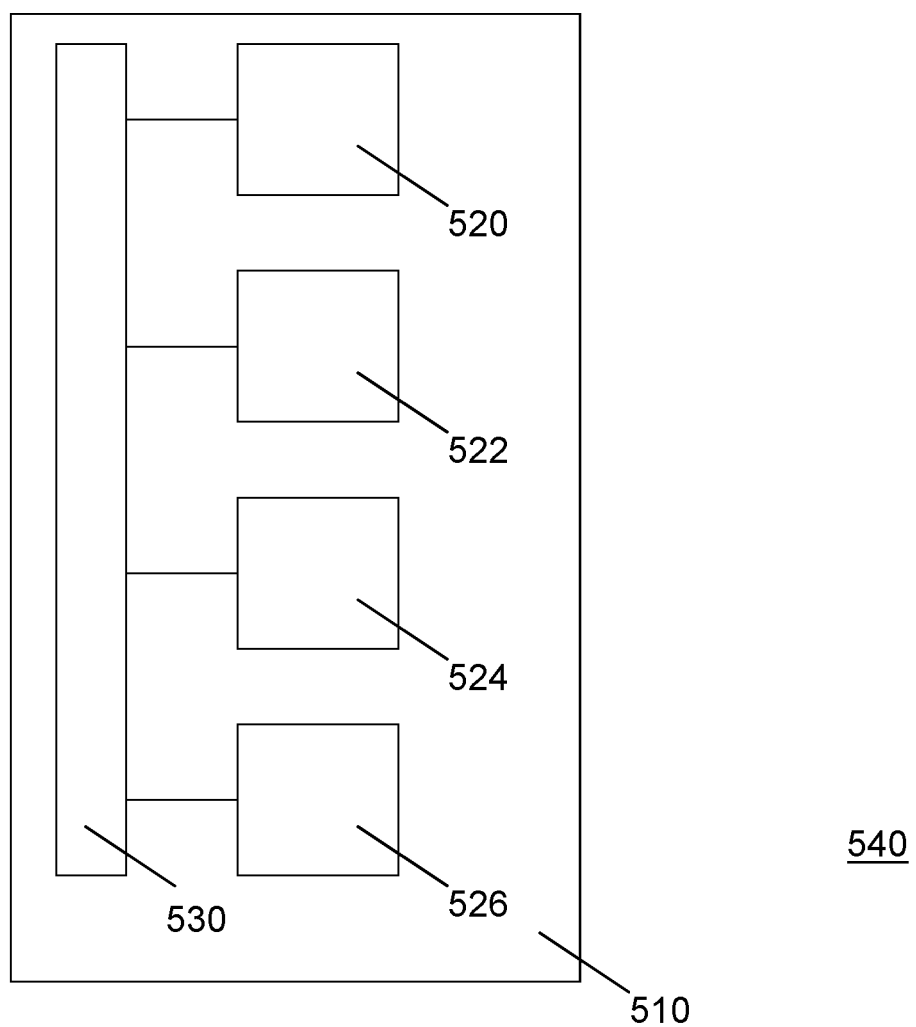
FIG. 5b shows a schematic representation of a smart card.

FIG. 5a shows in top-view a schematic representation of a smart card 500 according to the invention. The smart card comprises an integrated circuit 510 and a, typically plastic, card 505 supporting integrated circuit 510. The architecture of integrated circuit 510 is schematically shown in FIG. 5b. Circuit 510 comprises a processing unit 520, e.g. a CPU, for running computer program components to execute a method according to the invention and/or implement its modules or units. Circuit 510 comprises a memory 522 for storing programming code, data, cryptographic keys, helper data etc. Part of memory 522 may be read-only. Part of memory 522 may be high security memory, e.g., fuses for storing security related data, e.g., keys. Circuit 510 comprises a physical unclonable function 524. Physical unclonable function 524 may be combined with memory 522. Circuit 210 may comprise a communication element 526, e.g., an antenna, connector pads or both. Circuit 510, memory 522, PUF 524 and communication element 526 may be connected to each other via a bus 530. The card may be arranged for contact and/or contact-less communication, using an antenna and/or connector pads respectively. The smart card may be used, e.g., in a set-top box to control access to content, in a mobile phone to control access to a telecommunication network, in a public transport system to control access to public transport, in a banking card to control access to a bank account, etc.

For example, memory 522 may comprise software for execution by processing unit 520. When the software is executed some of the functions of the modules of computing devices are performed. PUF 524 may comprise memory 110.

Figure 6:
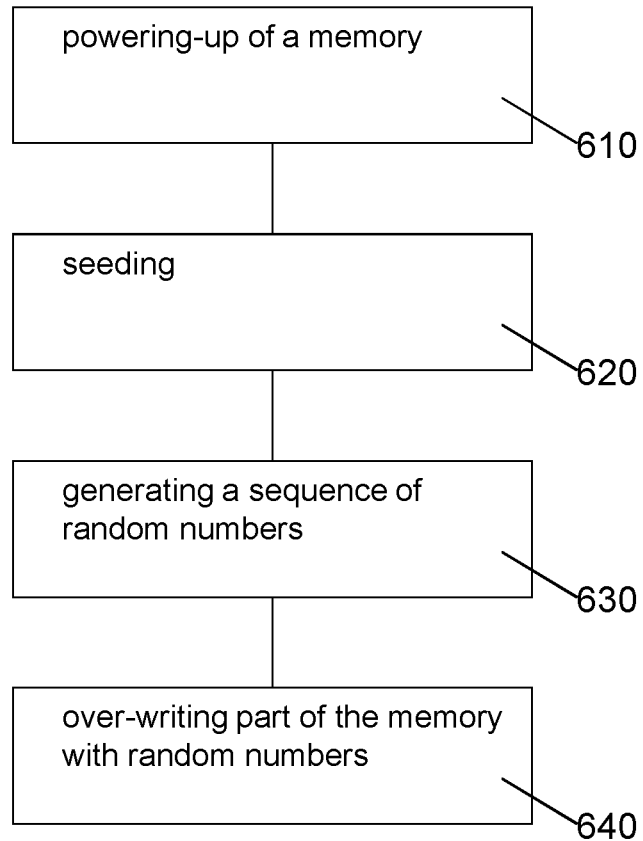
FIG. 6 shows a flow-chart illustrating a method according to the invention.

FIG. 6 illustrates a method 600 according to the invention with a flow chart. The method comprises powering-up of a writable, volatile memory 610, Seeding with a seed dependent upon an at least partially random memory content obtained form a part of the memory 620, generating the sequence of random numbers in dependence upon the seed 630 and over-writing the at least part of the memory with random numbers generated by in dependence upon the seed 640. Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 630 and 640 may be executed, at least partially, in parallel. Moreover, a given step may not have finished completely before a next step is started.

A method according to the invention may be executed using software, which comprises instructions for causing a processor system to perform method 600. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention.

The computer program may be comprised in an embedded processor. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Furthermore, the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A random number generating system for generating a sequence of random numbers comprising:
   a memory, the memory being writable and volatile, the memory producing an at least partially random memory content upon each powering-up of the memory so that the memory contains at least partially random memory content, the at least partially random memory content depending on variations in the production process while the memory was manufactured,
   an instantiating unit configured for seeding the random number generating system with a seed dependent upon the at least partially random memory content, the sequence of random numbers being generated in dependence upon the seed, and
   an over-writing unit configured for over-writing at least part of the memory with random numbers generated by the random number generating system in dependence upon the seed.

2. A random number generating system as in claim 1, wherein the over-writing unit is configured to over-write the memory with the random numbers.

3. A random number generating system as in claim 2, wherein the over-writing unit is configured to write a random number generated by the random number generating system in dependence upon the seed each time a predetermined number of random numbers of the sequence of random numbers have been generated.

4. A random number generating system as in claim 1, wherein the over-writing unit is configured for over-writing the at least part of the memory with the random numbers generated by the random number generating system in dependence upon the seed, upon the random number generating system receiving a reset signal.

5. A random number generating system as in claim 1, wherein a bit-size of the at least part of the memory is at least as large as a bit-size of the seed.

6. A random number generating system as in claim 1, comprising an internal state memory for storing an internal state and a generating unit configured for generating a random number of the sequence of random numbers from the current internal state in conjunction with deriving a new internal state from the current internal state stored in the internal state memory.

7. A random number generating system as in claim 6, wherein the bit-size of the at least part of the memory is at least as large as a bit-size of the internal state.

8. A random number generating system as in claim 6, wherein a bit-size of the at least part of the memory is at most twice the bit-size of the internal state, preferably at most the bit-size of the internal state, preferably equal to the bit size of the seed.

9. A random number generating system as in claim 6, wherein the generating unit is configured for deriving the new internal state from the current internal state before generating a random number of the sequence of random numbers from the current internal state, and wherein the over-writing unit is configured for over-writing the at least part of the memory with random numbers derived from the new internal state before generating a random number of the sequence of random numbers from the current internal state.

10. A random number generating system as in claim 1, wherein the random numbers generated by the random number generating system in dependence upon the seed for over-writing the at least part of the memory are part of the sequence of random numbers generated by the random number generating system.

11. A random number generating system as in claim 1, wherein the random numbers generated by the random number generating system in dependence upon the seed for over-writing at least part of the memory comprises intermediate data of the random number generating system which are not part of the sequence of random numbers generated by the random number generating system.

12. A random number generating system as in claim 1, wherein the sequence of random numbers is fully dependent upon the seed.

13. A random number generating system as in claim 1, wherein the memory comprises any one of SRAM memory, flip-flops and latches.

14. A smart card comprising a random number generating system as in claim 1.

15. A method of generating a sequence of random numbers comprising:
- powering-up of a memory, the memory being writable and volatile, the memory producing an at least partially random memory content upon each powering-up of the memory so that the memory contains said at least partially random memory content, the at least partially random memory content depending on variations in the production process while the memory was manufactured,
- seeding a random number generating system with a seed dependent upon the at least partially random memory content,
- generating by the random number generating system the sequence of random numbers in dependence upon the seed, and
- over-writing at least part of the memory with random numbers generated by the random number generating system in dependence upon the seed.

16. A computer program embodied in a non-transitory computer readable medium comprising computer program code means adapted to perform all the steps of claim 15 when the computer program is run on a computer.

* * * * *